United States Patent
Osotkraphun et al.

(10) Patent No.: US 10,073,961 B2
(45) Date of Patent: Sep. 11, 2018

(54) AUTHENTICATION SYSTEM, USER TERMINAL, CONTROL DEVICE, SERVICE PROVIDING DEVICE, PROGRAM, AND AUTHENTICATION METHOD

(71) Applicants: KABUSHIKI KAISHA TOSHIBA, Minato-ku (JP); TOSHIBA SOLUTIONS CORPORATION, Kawasaki-shi (JP)

(72) Inventors: Pakin Osotkraphun, Inagi (JP); Tatsuro Ikeda, Fuchu (JP)

(73) Assignees: Kabushiki Kaisha Toshiba, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 28 days.

(21) Appl. No.: 15/126,809

(22) PCT Filed: Sep. 12, 2014

(86) PCT No.: PCT/JP2014/074182
§ 371 (c)(1),
(2) Date: Sep. 16, 2016

(87) PCT Pub. No.: WO2016/038729
PCT Pub. Date: Mar. 17, 2016

(65) Prior Publication Data
US 2017/0277878 A1    Sep. 28, 2017

(51) Int. Cl.
*G06F 7/04*    (2006.01)
*G06F 21/33*    (2013.01)
(Continued)

(52) U.S. Cl.
CPC ............. *G06F 21/33* (2013.01); *G06F 21/30* (2013.01); *G06F 21/31* (2013.01); *G06F 21/35* (2013.01)

(58) Field of Classification Search
CPC .... G06Q 30/0617; G06Q 20/12; G06Q 20/18; G06Q 20/202; G06Q 20/206;
(Continued)

(56) References Cited

U.S. PATENT DOCUMENTS

2007/0288759 A1* 12/2007 Wood .................... G06Q 20/341
            713/186
2012/0253607 A1* 10/2012 Choi ........................ B60R 25/25
            701/49

FOREIGN PATENT DOCUMENTS

JP        2004-136784 A    5/2004
JP        2010-146095 A    7/2010
(Continued)

OTHER PUBLICATIONS

English machine translation of JP 2004-136784A.*
International Search Report dated Feb. 24, 2015 in PCT/JP2014/074182 Filed Sep. 12, 2014.

*Primary Examiner* — Yong Hang Jiang
(74) *Attorney, Agent, or Firm* — Oblon, McClelland, Maier & Neustadt, L.L.P.

(57) ABSTRACT

An authentication system of an embodiment includes a control device, a user terminal, and a service providing device. The control device includes a storage unit, an information acquisition unit, an authentication processing unit, and a control management unit. The information acquisition unit acquires the authentication element for authentication. The authentication processing unit transmits a comparison request message including the authentication element for comparison with the authentication element acquired by the information acquisition unit to the user terminal, receives a comparison response message corresponding to the comparison request message from the user terminal, registers the acquired authentication element in the storage unit and "invalidates" a status of the authentication (Continued)

element when the comparison response message indicates comparison success, transmits an authentication element registration response message to the service providing device, and "validates" the status of the authentication element registered in the storage unit when an authentication element validation instruction is received from the service providing device in correspondence with the authentication element registration response message.

4 Claims, 7 Drawing Sheets

(51) Int. Cl.
*G06F 21/31* (2013.01)
*G06F 21/30* (2013.01)
*G06F 21/35* (2013.01)

(58) Field of Classification Search
CPC .. G06Q 20/4014; G06Q 20/405; G06Q 40/02; G07F 9/026; G07F 11/00
USPC .......................................... 340/5.2, 5.7, 5.72
See application file for complete search history.

(56) References Cited

FOREIGN PATENT DOCUMENTS

| | | |
|---|---|---|
| JP | 2012-79109 A | 4/2012 |
| JP | 2012-203428 A | 10/2012 |
| JP | 2013-126197 A | 6/2013 |
| JP | 2013-258491 A | 12/2013 |

* cited by examiner

AUTHENTICATION SYSTEM, USER TERMINAL, CONTROL DEVICE, SERVICE PROVIDING DEVICE, PROGRAM, AND AUTHENTICATION METHOD

TECHNICAL FIELD

Embodiments of the present invention relate to an authentication system, a user terminal, a control device, a service providing device, a program, and an authentication method.

BACKGROUND ART

In recent years, services in which shared articles are available in the form of renting or sharing the articles have become widespread. As an example, the use of vehicle sharing services (referred to as car sharing, a rental car service, and the like) is increasing and becoming widespread. In these services, technology for unlocking a door using an individual identification token such as a member card without exchanging a key in a face-to-face manner at the time of rental has been developed for convenience of users.

However, while it is possible to identify a user using only the individual identification token, it is impossible to manage authority of a use range or the like or determine the approval of the authority. To solve such a problem, a method of authenticating a user having use authority using information indicating the use authority is taken.

In addition, because it is impossible to confirm whether a person possessing the token is identified as a service user in the authentication method using the individual identification token, reliable personal authentication is difficult. To solve such a problem, authentication technology for reliable personal authentication according to authentication using biological information specific to an individual without imposing the burden of an operation or the like on the user is being developed.

Also, in an authentication method in which communication with a server device is necessary at the time of authentication, it is impossible to use the service in an environment in which communication with the server cannot be connected. Thus, authentication technology for providing a necessary minimum function for a vehicle even in a situation in which communication between an article (a vehicle or the like) and the server is not established is also being developed.

Therefore, when the authentication process is performed using biometrics or the like, it is necessary to reduce the burden on the side of a server device which manages an authentication element. Also, it is necessary to prevent information leakage from occurring when an authentication element is communicated between the user side and the server device.

Further, it is necessary to prevent a degree of the authentication process from being degraded even when communication between the user side and the server device is disconnected, in other words, even when the user side and the server device are not constantly connected.

Further, it is necessary to avoid a situation in which a service is unusable when the user loses a physical key (for example, a metallic key, an IC card having the function of a key, or the like).

CITATION LIST

Patent Literature

[Patent Literature 1]
Japanese Unexamined Patent Application, First Publication No. 2012-079109
[Patent Literature 2]
Japanese Unexamined Patent Application, First Publication No. 2010-146095
[Patent Literature 3]
Japanese Unexamined Patent Application, First Publication No. 2012-203428

SUMMARY OF INVENTION

Technical Problem

An objective of the present invention is to provide an authentication system, a user terminal, a control device, a service providing device, a program, and an authentication method in which it is unnecessary to transmit information of an authentication element in a communication path between a user side and a server device side and it is possible to perform a sufficient authentication process even when communication is not constantly connected between the user side and the server device side.

Solution to Problem

An authentication system of an embodiment includes a control device, a user terminal, and a service providing device.

The control device includes: a storage unit, an information acquisition unit, an authentication processing unit, and a control management unit. The storage unit stores an authentication element. The information acquisition unit acquires the authentication element for authentication. The authentication processing unit transmits a comparison request message including the authentication element for comparison with the authentication element acquired by the information acquisition unit to the user terminal, receives a comparison response message corresponding to the comparison request message from the user terminal, registers the acquired authentication element in the storage unit and "invalidates" a status of the authentication element when the comparison response message indicates comparison success, transmits an authentication element registration response message to the service providing device, and "validates" the status of the authentication element registered in the storage unit when an authentication element validation instruction is received from the service providing device in correspondence with the authentication element registration response message. The control management unit controls an object on the basis of the "validation" of the status of the authentication element as a result of processing by the authentication processing unit.

The user terminal includes: a storage unit and an authentication processing unit. The storage unit pre-stores a user authentication element which is an authentication element of a user. The authentication processing unit compares an authentication element included in a comparison request message with the user authentication element stored in the storage unit when the comparison request message including the authentication element is received from the control device and transmits a comparison response message including information indicating whether a comparison process succeeds or fails to the control device.

The service providing device includes a verification unit and a service providing unit. The verification unit verifies assertion information related to an authentication process included in the authentication element registration response message when an authentication element registration response message is received from the control device and transmits an authentication element validation instruction for validating a status of the authentication element stored in the storage unit within the control device to the control device when the verification succeeds. The service providing unit manages a state for providing a user with a service using an object to be controlled by the control device when the verification by the verification unit succeeds.

DESCRIPTION OF EMBODIMENTS

Hereinafter, an authentication system, a user terminal, a control device, a service providing device, a program, and an authentication method of an embodiment will be described with reference to the drawings.

First, each device according to the present embodiment and its functional configuration will be described.

Figure 1:
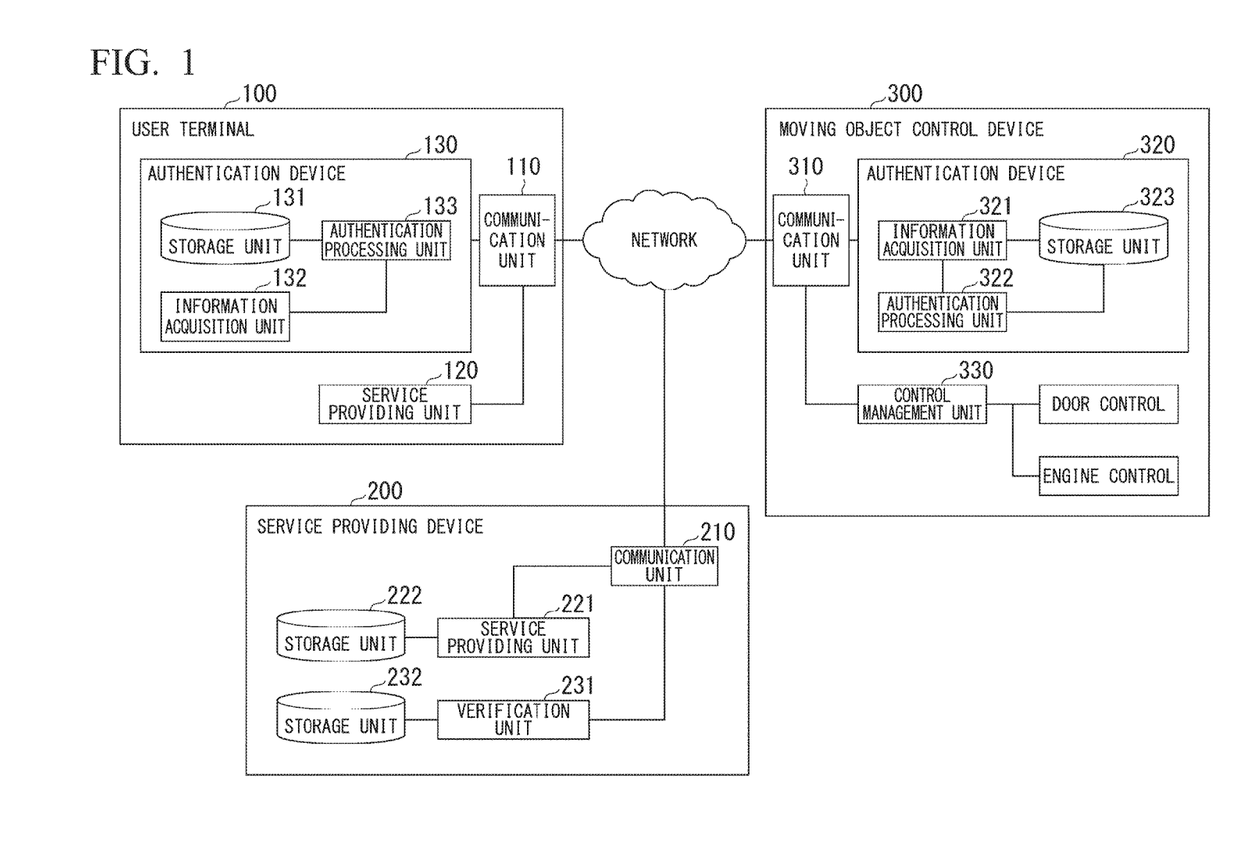
FIG. 1 is a block diagram illustrating a schematic functional configuration of an authentication system according to the present embodiment.

FIG. 1 is a block diagram illustrating a schematic functional configuration of the authentication system implemented in the present embodiment. As illustrated in FIG. 1, the system according to the present embodiment includes a user terminal 100, a service providing device 200, and a moving object control device 300. The moving object control device is also simply referred to as a "control device."

The user terminal 100 is, for example, a smartphone, a personal computer, a wearable computer, a portable information communication device, or the like. When there are a plurality of users, each user generally possesses and uses one user terminal 100. The service providing device 200 is a device implemented using a server computer or the like. Also, the service providing device 200 may be implemented as a so-called cloud using a plurality of devices. The service providing device 200 includes a function of performing reservation management of a moving object (a vehicle or the like), a function of performing verification related to an authentication process of a user, and the like. The moving object control device 300 includes a capability of controlling a function of the moving object. When the moving object is a vehicle, the moving object control device 300 unlocks/locks a door lock of the vehicle or unlocks/locks an engine lock of the vehicle. The control of the engine lock is linked to a function of an immobilizer of the vehicle. Generally, one moving object control device 300 is provided for one moving object.

The user terminal 100, the service providing device 200, and the moving object control device 300 are connected to be able to communicate with one another through a network. On this network, bidirectional data communication using, for example, internet protocol (IP), is performed. Although it is preferable to use short-range communication such as a wireless LAN, Bluetooth, or near field communication (NFC) between the user terminal 100 and the moving object control device 300, the present invention is not particularly limited to a communication distance. Although it is preferable to use a wide area network (WAN) between the user terminal 100 and the service providing device 200 or between the moving object control device 300 and the service providing device 200, the present invention is not particularly limited to a communication distance.

The user terminal 100 includes a communication unit 110, a service management unit 120, and an authentication device 130. The communication unit 110 provides a function of enabling the service management unit 120 or the authentication device 130 to communicate with an external device via a network. Here, the external device is the service providing device 200 or the moving object control device 300. The service management unit 120 has a function of requesting the service providing device 200 to provide various services related to the use of a moving object.

The authentication device 130 provides an authentication function and includes a storage unit 131, an information acquisition unit 132, and an authentication processing unit 133. The authentication device 130 authenticates the user. Although it is preferable for the authentication device 130 to use technology of biometrics using a feature of each individual, other technology for authentication may be used.

The storage unit 131 has a function of storing information necessary for personal authentication of the user and a function of delivering the stored information to the authentication processing unit 133. Also, the storage unit 131 is assumed to pre-store a user authentication element which is an authentication element of the user. The storage unit 131 is implemented using a storage device such as, for example, a semiconductor memory. The information acquisition unit 132 has a function of acquiring information necessary for personal authentication of the user from an outside and a function of delivering the stored information to the authentication processing unit 133. The authentication processing unit 133 has a function of receiving information from the storage unit 131 and the information acquisition unit 132. Also, the authentication processing unit 133 has a function of performing personal authentication of the user using information received from the storage unit 131 and the information acquisition unit 132. Also, the authentication processing unit 133 has a function of generating assertion information asserting that the process of the authentication device 130 is performed correctly. Also, the authentication processing unit 133 has a function of delivering information to the communication unit 110. In other words, the authentication processing unit 133 compares an authentication element included in a comparison request message with a user authentication element stored in the storage unit 131 when a comparison request message including the authentication element is received from the moving object control device 300 and transmits a comparison response message including information indicating whether the comparison process succeeds or fails to the moving object control device 300.

Also, it is preferable that ACBioInstance defined in ISO/IEC 24761 "authentication context for biometrics" be used as the assertion information generated by the authentication processing unit 133. Here, as long as the validity of a process executed by the authentication device 130 or used information can be asserted, the authentication processing unit 133 may use assertion information other than ACBioInstance. Also, likewise, ACBioInstance defined in ISO/IEC 24761 is preferable for various types of assertion information described below.

The service providing device 200 includes a communication unit 210, a service providing unit 221, a storage unit 222, a verification unit 231, and a storage unit 232. The storage units 222 and 232 are implemented using a storage device such as a semiconductor memory or a hard disk device.

The communication unit 210 provides a function of enabling the service providing unit 221 and the verification unit 231 to perform communication inside the service providing device 200. Also, the communication unit 210 provides a function of enabling the service providing unit 221 and the verification unit 231 to communicate with the user terminal 100, the moving object control device 300, or the like via a network. The service providing unit 221 has a function of processing an externally received service request, a function of managing information stored in the storage unit 222, and a function of receiving and transmitting information from and to the communication unit 210. In other words, when verification by the verification unit 23 succeeds, the service providing unit 221 manages a state for providing a user with a service using an object to be controlled. The storage unit 222 has a function of storing reservation information related to the use reservation of a moving object and a function of delivering the stored information to the service providing unit 221. Also, details of the reservation information will be described below with reference to the other drawings.

The verification unit 231 has a function of verifying validity of the assertion information, a function of generating a verification result of the assertion information, a function of outputting the verification result of the assertion information, a function of receiving information stored in the storage unit 232, and a function of delivering information to the communication unit 210. In other words, when an authentication element registration response message is received from the moving object control device 300, the verification unit 231 verifies the assertion information related to an authentication process included in the authentication element registration response message and transmits an authentication element validation instruction for validating a status of an authentication element stored in the storage unit 323 of the moving object control device 300 to the moving object control device 300 when the authentication succeeds. The storage unit 232 has a function of storing information necessary for verifying the assertion information and a function of delivering the information to the verification unit 231. Also, details of the information necessary for verifying the assertion information will be described below with reference to the other drawings.

The moving object control device 300 includes a communication unit 310, an authentication device 320, and a control management unit 330.

The communication unit 310 provides a function of enabling the authentication device 320 or the control management unit 330 to communicate with the user terminal 100 or the service providing device 200 via a network. The authentication device 320 includes an information acquisition unit 321, an authentication processing unit 322, and a storage unit 323. The information acquisition unit 321 has a function of acquiring information necessary for personal authentication from the user and a function of delivering the acquired information to the authentication processing unit 322 and the storage unit 323. In other words, the information acquisition unit 321 acquires an authentication element for authenticating the user. The authentication processing unit 322 has a function of receiving information from the information acquisition unit 321 and the storage unit 323, a function of performing personal authentication of the user using the received information, a function of generating assertion information asserting that the process of the authentication device 320 is performed correctly, a function of verifying the validity of the assertion information, a function of managing the authentication element, a function of confirming the validity of an authentication element certificate, and a function of receiving and transmitting information from and to the communication unit 310. In other words, the authentication processing unit 322 transmits a comparison request message including an authentication element for comparison with the authentication element acquired by the information acquisition unit 321 to the user terminal 100, receives a comparison response message corresponding to the comparison request message from the user terminal 100, registers the acquired authentication element in the storage unit 323 and "invalidates" a status of the authentication element when the comparison response message indicates comparison success, transmits the authentication element registration response message to the service providing device 200, and "validates" the status of the authentication element registered in the storage unit 323 when an authentication element validation instruction is received from the service providing device 200 in correspondence with the authentication element registration response message. The storage unit 323 has a storage function for storing the authentication element or the authentication element certificate.

The control management unit 330 has a function of controlling each unit provided in the moving object. In other words, the object is controlled on the basis of the "validation" of the status of the authentication element as a result of processing by the authentication processing unit 322. In the present embodiment, the moving object is a timeshare automobile, the control management unit 330 has, for example, a function of controlling the opening/closing of a door lock of the moving object and controlling the opening/closing of an engine lock of the moving object. Also, the control management unit 330 has a function of receiving and transmitting information from and to the communication unit 310. Also the control management unit 330 may be configured to control each unit other than the door lock and the engine of the moving object.

Next, a flow of an overall process when the present embodiment is used will be described.

Figure 2:
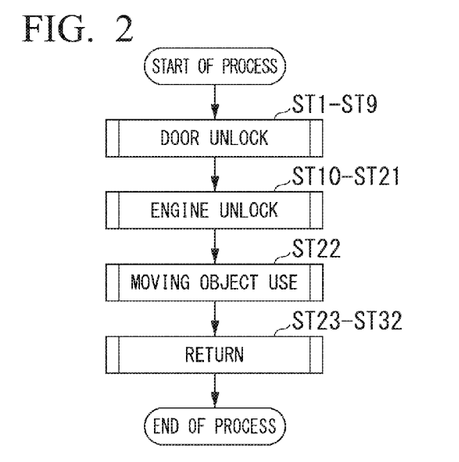
FIG. 2 is a flowchart illustrating a flow of an overall process of the authentication system according to the present embodiment.

FIG. 2 is a flowchart illustrating a flow of a series of processes of the overall system illustrated in FIG. 1. In FIG. 2, the user makes a reservation for the use of a moving object in advance, and performs use in a series of flows such as the unlocking of the door, the unlocking of the engine, the use of the moving object, and the return of the moving object. The unlocking of the door (steps ST1 to ST9) will be described in further detail with reference to FIG. 3. Also, the unlocking of the engine (steps ST10 to ST21) will be described in further detail with reference to FIG. 4. Also, the return of the moving object (steps ST23 to ST32) will be described in further detail with reference to FIG. 8.

Figure 3:
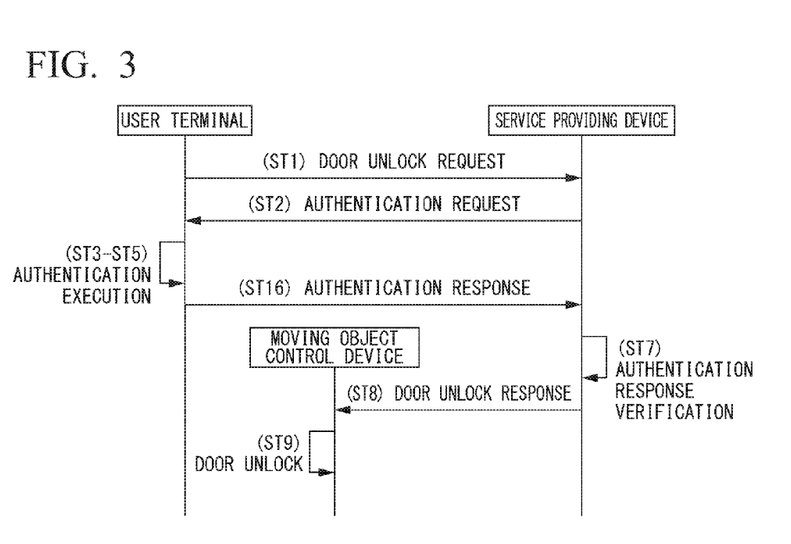
FIG. 3 is a sequence chart illustrating a flow of a process (steps ST1 to ST9) related to unlocking of a door of a moving object in the authentication system according to the present embodiment.

FIG. 3 is a sequence chart illustrating a flow of a process related to unlocking of a door of a moving object in the authentication system according to the present embodiment. The following description will follow this chart.

In step ST1, the user terminal 100 transmits a message for requesting the service providing device 200 to unlock the door of the moving object on the basis of an operation by the user. The message of the unlock request of the door includes moving object identification information for identifying a moving object to be used. Specifically, the service management unit 120 transmits the request and the service providing unit 221 receives the request. Also, before the execution of step ST1, the user has already completed a reservation related to the use of the moving object.

In step ST2, the service providing unit 221 of the service providing device 200 confirms whether a record having matching the moving object identification information is present in the storage unit 222 using the moving object identification information included in the received door unlock request as a key. When the record is present, the service providing unit 221 confirms that the moving object can be rented. A state in which the moving object can be rented is, for example, a state in which a person who has made a reservation is registered and the door and the engine of the moving object are locked. Because the moving object is reserved, but is not rented in this state, the service providing unit 221 can determine that the moving object can be rented. When the moving object can be rented, the service providing unit 221 transmits an authentication request message to the authentication processing unit 133.

In steps ST3 to ST5, an authentication process is performed in the user terminal 100. Also, in the authentication process of steps ST3 to ST5, for example, authentication based on a user name and a password may be performed, but an authentication method based on ISO/IEC 24761 "authentication context for biometrics" is preferable to perform higher security authentication.

In step ST3, the authentication processing unit 133 of the user terminal 100 receives a transmitted authentication request message. The authentication processing unit 133 requests the user to provide an authentication element.

Here, the authentication element is information for biometrics of the user and is information indicating an individual biological feature of the user. Specifically, the authentication element is, for example, a fingerprint, a palm print, a voice print, an arrangement relationship between parts of a face, a pupil pattern of an iris, or the like, and the present invention is not limited thereto. Also, the authentication element may be in the form of raw information of an acquired image or the like, may be a feature quantity extracted from the acquired image or the like, and may further be a digital signature result thereof or the like.

In step ST14, the authentication element is acquired from the user by the information acquisition unit 132 within the user terminal 100. The information acquisition unit 132 supplies the acquired authentication element to the authentication processing unit 133.

In step ST5, the authentication processing unit 133 performs personal authentication of the user using the authentication element of the user acquired in step ST14 and information pre-registered in the storage unit 131. A process of the personal authentication is a process based on a standardized authentication method. When the user's identity is confirmed, the authentication processing unit 133 generates an authentication result and assertion information of an authentication process as an authentication response. Here, the assertion information of the authentication process asserts that the generated authentication result is a result of the authentication process executed in correspondence with the authentication request transmitted in step ST2. Also, the assertion information of the authentication process asserts that the authentication process is executed correctly and personal authentication is performed. Also, it is preferable that ACBioInstance defined in the above-described ISO/IEC 24761 "authentication context for biometrics" be used as the assertion information of the authentication process.

In step ST6, the authentication processing unit 133 transmits a message of an authentication response generated in step ST5 to the verification unit 231 of the service providing device 200.

In step ST7, the verification unit 231 verifies the validity of the authentication response received from the authentication processing unit 133. Also, information for verifying the authentication result is pre-registered in the storage unit 232 and the verification unit 231 uses the information of the storage unit 232 when the validity of the received authentication result is verified.

In step ST8, the verification unit 231 transmits a message of a door unlock response to the control management unit 330 of the moving object control device 300 when the verification performed in step ST7 has succeeded. The message of the door unlock response is used for the moving object control device 300 to unlock the door lock of the moving object. Also, the verification unit 231 requests the storage unit 222 to update registered reservation information. Thereby, the storage unit 222 updates the door lock state of the moving object to an unlocked state.

In step ST9, the control management unit 330 unlocks the door lock according to the received door unlock response message.

Figure 4:
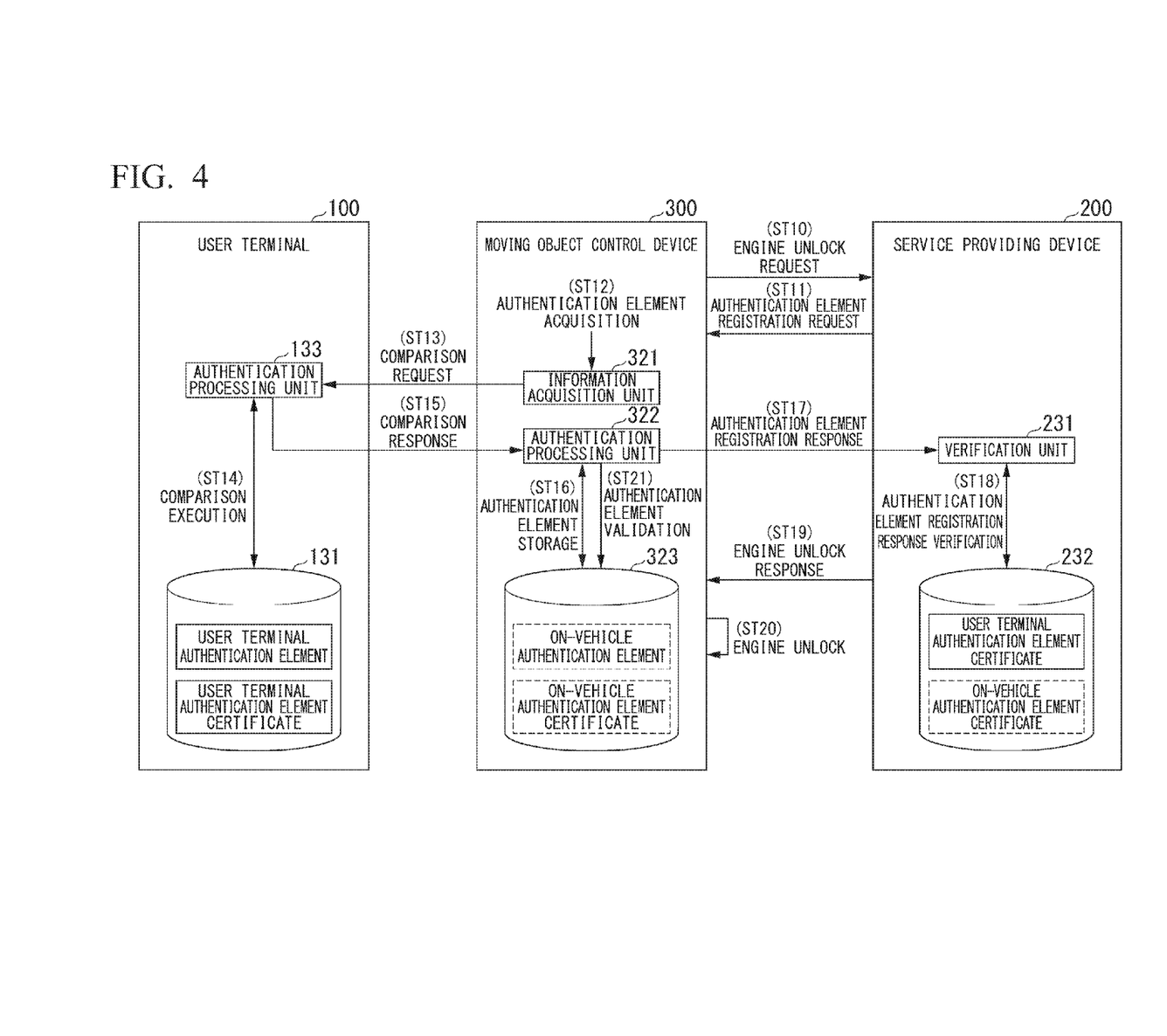
FIG. 4 is a sequence chart illustrating a flow of a process (steps ST10 to ST21) related to unlocking of an engine lock of the moving object in the authentication system according to the present embodiment.

FIG. 4 is a sequence chart illustrating a flow of a process related to unlocking of an engine lock of the moving object in the authentication system according to the present embodiment. Also, a series of sequences illustrated in FIG.

4 includes an authentication process based on an authentication element, a verification process related to the authentication process, the generation and storage of a certificate related to the authentication process, the storage of the authentication element within the moving object control device, and a procedure of validating the authentication element.

Also, data surrounded by a broken line among data illustrated in FIG. 4 is not stored before the unlocking of the engine but is data generated and stored when the engine is unlocked. The data surrounded by the broken line is an on-vehicle authentication request certificate. Likewise, the data surrounded by the broken line is an on-vehicle authentication element (a control-device-side authentication element) and an on-vehicle authentication certificate in the storage unit 323.

The following description will follow this chart.

First, in step ST10, the user gets in the moving object and operates the moving object control device 300, thereby requesting engine activation. Then, the control management unit 330 within the moving object control device 300 transmits a message of an engine unlock request to the service providing unit 221 of the service providing device 200. The message of the engine unlock request includes moving object identification information.

In step ST1, the service providing unit 221 retrieves information registered in the storage unit 222 using moving object identification information included in the received engine unlock request as a key. When a record matching the moving object identification information is present in the storage unit 222, the service providing unit 221 confirms that the use of the moving object can be started. For example, when the person who has made a reservation is registered and the door lock is unlocked, but the engine is locked, the service providing unit 221 determines that the moving object can be rented and the use of the moving object can be started. In this case, the service providing unit 221 transmits a message of an authentication element registration request to the authentication processing unit 322 of the moving object control device 300.

In step ST12, the authentication processing unit 322 receiving the above-described message of the authentication element registration request requests the user to provide an authentication element. For example, when authentication using biological information is used, the information acquisition unit 321 acquires raw data of biological information as an authentication element of the user here.

In step ST13, the authentication processing unit 322 transmits a message of a comparison request including the authentication element acquired in step ST12 to the authentication processing unit 133 of the user terminal 100. Also, here, it is preferable that a communication connection between the moving object control device 300 and the user terminal 100 use short-range communication such as Bluetooth or NFC.

In step ST14, the authentication processing unit 133 compares the authentication element included in the received message of the comparison request with the authentication element registered in the storage unit 131. As illustrated, the storage unit 131 stores a user terminal authentication element and a user terminal authentication element certificate. The authentication element stored in the storage unit 131 is pre-registered by the user. The authentication processing unit 133 generates comparison assertion information. The comparison assertion information asserts that its authentication result is obtained by execution for the comparison request transmitted in step ST13, the comparison process is executed correctly, and an authentication element used in the comparison process is reliable (a comparison statement). The authentication processing unit 133 generates a message of a comparison response including the above-described comparison result and the above-described comparison assertion information. Also, the message of the comparison response will be described below with reference to FIG. 5.

In step ST15, the authentication processing unit 133 transmits the message of the comparison response generated in the above step ST14 to the authentication processing unit 322 of the moving object control device 300. Also, here, it is preferable that a communication connection between the moving object control device 300 and the user terminal 100 use short-range communication such as Bluetooth or NFC.

In step ST16, the authentication processing unit 322 registers an authentication element acquired in step ST12 in the storage unit 323 on the condition that the comparison in step ST14 has succeeded. The authentication element stored in the storage unit 323 within the moving object control device 300 is referred to as an on-vehicle authentication element. Also, in this step, the authentication processing unit 322 "invalidates" the status of the authentication element registered in the storage unit 323. Several methods are considered for indicating that the status of the authentication element is "invalid." As the first method, information explicitly indicating the "invalid" status may be stored in the storage unit 323. Also, as the second method, it may be considered to be "invalid" when the authentication element certificate corresponding to the stored authentication element is not registered.

The authentication processing unit 322 generates a message of an authentication element registration response. The message of the authentication element registration response will be described below in further detail with reference to FIG. 6.

In step ST17, the authentication processing unit 322 transmits the message of the authentication element registration response generated in step ST16 in response to the above-described authentication element registration request. In the service providing device 200, the verification unit 231 receives the message of the authentication element registration response.

In step ST18, the verification unit 231 performs a verification process using assertion information received as the message of the authentication element registration response in step ST17. That is, the verification unit 231 verifies whether the authentication process and the registration process have been performed correctly in response to the authentication element registration request transmitted in step ST11. When this verification has succeeded, the verification unit 231 generates an on-vehicle authentication element certificate and registers the on-vehicle authentication element certificate in the storage unit 232.

This on-vehicle authentication element certificate includes on-vehicle authentication element identification information for identifying an on-vehicle authentication element registered in the storage unit 323 of the moving object control device 300, an authentication assertion, and an authentication element registration assertion. It is preferable that biometric reference template certification defined in ISO/IEC 24761 "authentication context for biometrics" be used as the on-vehicle authentication element certificate. Because the authentication assertion is included in the on-vehicle authentication element certificate, it can be seen that the authentication element registered in the moving object control device 300 is based on an authentication element stored in the user terminal 100. Thereby, while the user uses the moving object, it is possible to perform reliable personal authentication without using the user terminal 100 when authentication is performed between the moving object control device 300 and the service providing device 200.

Also, in step ST18, the verification unit 231 further requests the storage unit 222 to update registered reservation information. That is, the verification unit 231 updates the engine lock state of the moving object in the storage unit 222 to an "unlocked" state and updates the authentication element to a "registered" state.

In step ST19, the verification unit 231 transmits a message of an engine unlock response (an authentication element validation instruction) to the side of the moving object control device 300 when the verification process in step ST18 has succeeded. The message of the engine unlock response includes engine unlock permission and the on-vehicle authentication element certificate generated in step ST18. In the moving object control device 300, the authentication processing unit 322 receives a message of an engine unlock response.

In step ST20, the control management unit 330 unlocks the engine lock of the moving object according to the engine unlock permission included in the engine unlock response.

In step ST21, the authentication processing unit 322 saves the on-vehicle authentication element certificate included in the received message of the engine unlock response in the storage unit 323. The on-vehicle authentication element certificate includes on-vehicle authentication element identification information. Accordingly, the authentication processing unit 322 can confirm the validity of the authentication element certificate by comparing the received on-vehicle authentication element identification information with the authentication element identification information registered in the storage unit 323. In addition to this, the authentication processing unit 322 confirms the validity of the authentication element certificate using information such as a valid period. When the authentication element certificate is valid, the authentication processing unit 322 updates the status of the authentication element registered in step ST16 to a "valid" status. Thereby, the authentication processing unit 322 can perform an authentication process using the registered authentication element and verify the validity of the authentication process performed by the verification unit 231.

Thus, a procedure of the process illustrated in FIG. 4 is completed.

Next, in step ST22 (not illustrated), the information acquisition unit 321 within the moving object control device 300 requests the user to provide the authentication element when it is necessary to perform personal authentication while the user uses the moving object. The information acquisition unit 321 acquires information of the authentication element provided from the user and transmits the acquired information to the authentication processing unit 322. Also, the authentication processing unit 322 performs an authentication process using the information acquired by the information acquisition unit 321 and information registered in the storage unit 323. The validity of the authentication element certificate may be in succession to the validity of the authentication element. For example, it is possible to perform a process of setting the rent deadline of the moving object as a valid period of the authentication element certificate and rewriting the status of the authentication element to an "invalid" status at a point in time at which the authentication element certificate becomes invalid.

Here, a configuration of main data in the above-described process will be described.

Figure 5:
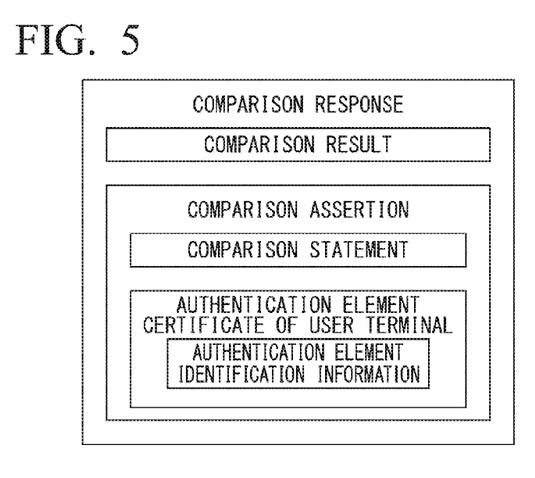
FIG. 5 is a schematic diagram illustrating a configuration of data of a comparison response transmitted from the user terminal 100 to the moving object control device 300 in step ST15 in the authentication system according to the present embodiment.

FIG. 5 is a schematic diagram illustrating a configuration of a message of a comparison response. The message of the comparison response is generated in the above-described step ST14 (FIG. 4) and transmitted from the user terminal 100 to the moving object control device 300 in step ST15. As illustrated, the message of the comparison response is configured to include a comparison result and a comparison assertion.

The comparison result indicates a result of the comparison in step ST14 in the user terminal 100.

The comparison assertion includes a comparison statement and an authentication element certificate of the user terminal. The comparison statement asserts that its authentication result is obtained by execution for the comparison request transmitted in step ST13, the comparison process is executed correctly, and an authentication element used in the comparison process is reliable. Also, the authentication element certificate of the user terminal is information of the user terminal authentication element certificate stored in the storage unit 131.

The above-described authentication element certificate of the user terminal includes authentication element identification information.

Figure 6:
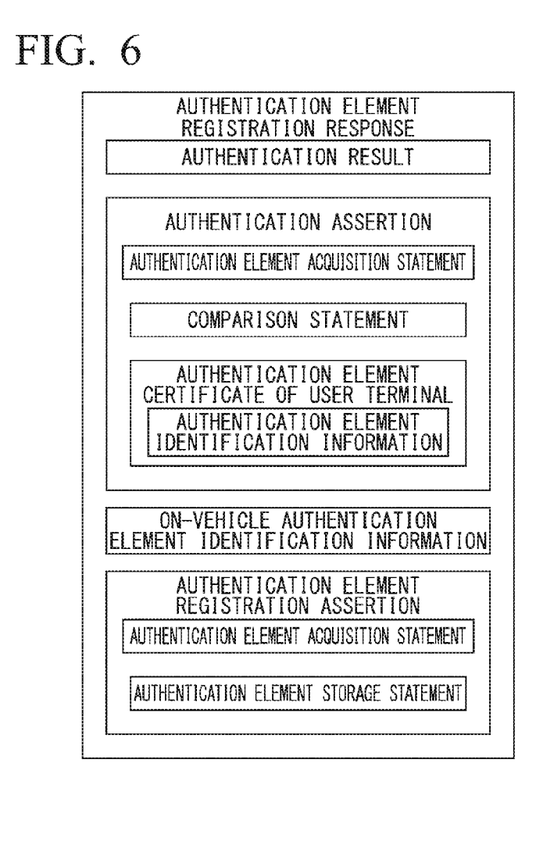
FIG. 6 is a schematic diagram illustrating a configuration of data of an authentication element registration response transmitted from the moving object control device 300 to the service providing device 200 in step ST17 in the authentication system according to the present embodiment.

FIG. 6 is a schematic diagram illustrating a configuration of a message of an authentication element registration response generated by the authentication processing unit 322 in the above-described step ST16 (FIG. 4). The message of the authentication element registration response is configured to include an authentication result, an authentication assertion asserting that the authentication process has been performed correctly, identification information for identifying an on-vehicle authentication element registered in step ST16 (on-vehicle authentication element identification information), and an authentication element registration assertion asserting that the registration process of the authentication element was performed correctly.

The above-described authentication result indicates a result of authentication started from step ST12.

In addition, the above-described authentication assertion is configured to include an authentication element acquisition statement asserting that the authentication element acquisition process in step ST12 has been performed correctly and a comparison assertion transmitted from the side of the user terminal 100 in step ST15.

The above-described identification information for identifying the on-vehicle authentication element is any information for identifying the authentication element registered in the storage unit 323. It is preferable that, for example, a hash value calculated by applying a predetermined hash function to the authentication element be used as identification information for identifying the on-vehicle authentication element.

Also, the above-described authentication element registration assertion is configured to include an authentication element acquisition statement asserting that the authentication element acquisition process of step ST12 has been performed correctly and an authentication element storage statement asserting that the storage process of the on-vehicle authentication element has been performed correctly.

Figure 7:
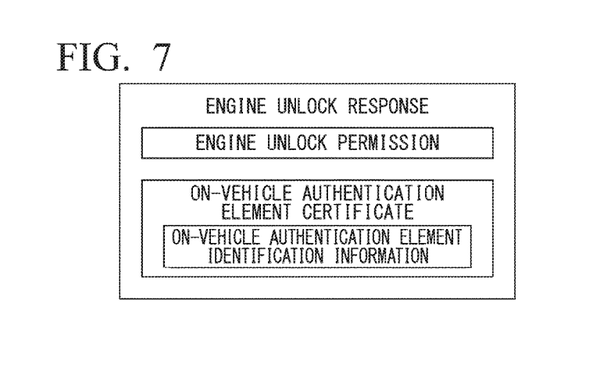
FIG. 7 is a schematic diagram illustrating a configuration of data of an engine unlock response (validation of an authentication element based on completion of verification of the authentication element) transmitted from the service providing device 200 to the moving object control device 300 in step ST19 in the authentication system according to the present embodiment.

FIG. 7 is a schematic diagram illustrating a configuration of a message of an engine unlock response. The message of the engine unlock response is the message transmitted from the service providing device 200 to the moving object control device 300 in the above-described step ST19 (FIG. 4). The message of the engine unlock response includes data indicating engine unlock permission and an on-vehicle authentication element certificate generated in step ST18.

The above-described on-vehicle authentication element certificate includes on-vehicle authentication element identification information.

The description will now return to the flow of processing.

Figure 8:
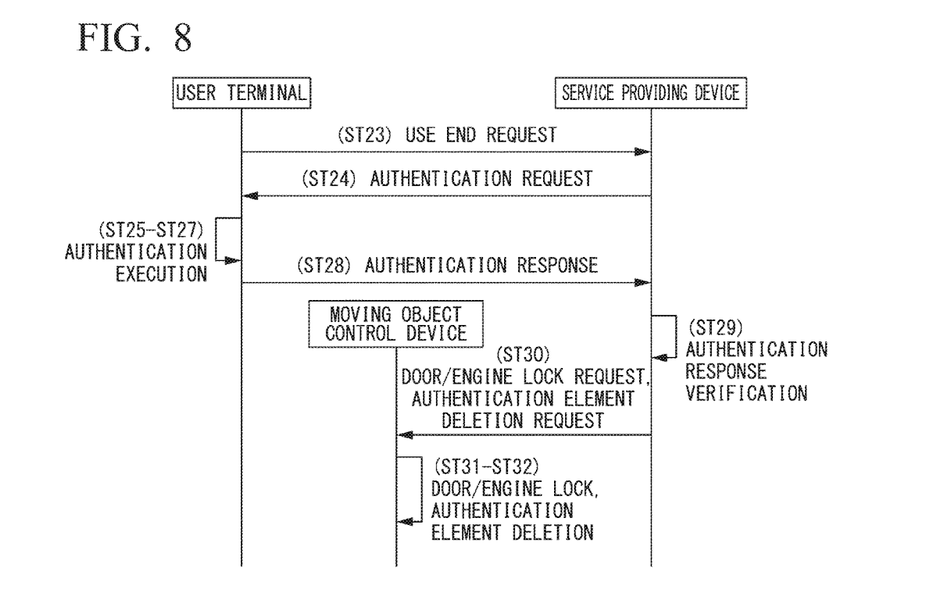
FIG. 8 is a sequence chart illustrating a flow of a process (steps ST23 to ST32) related to the end of use of the moving object in the authentication system according to the present embodiment.

FIG. 8 is a sequence chart illustrating a flow of a process at the time of the end of use of the moving object in the authentication system according to the present embodiment. The following description will follow this chart.

In step ST23, the user gets out of the moving object and requests a service end by operating the user terminal 100. In response to this, the service management unit 120 within the user terminal 100 transmits a message of a use end request to the service providing unit 221 of the service providing device 200. The message of the use end request includes moving object identification information.

In step ST24, the service providing unit 221 retrieves the storage unit 222 using moving object identification information included in the transmitted message of the use end request as the key. The service providing unit 221 confirms whether a record having matching moving object identification information is present in the storage unit 222. When the record is present, the service providing unit 221 confirms that the moving object is in a rented state. An example of a method of confirming that the moving object is in the rented state is as follows. That is, for example, when a person who has made a reservation is registered and the door lock and the engine lock are in the unlocked state, the service providing unit 221 can determine that the moving object is in the rented state. In this case, the service providing unit 221 transmits a message of an authentication request to the authentication processing unit 133.

In step ST25, the authentication processing unit 133 requests the user to provide an authentication element when the message of the authentication request is received.

In step ST26, the information acquisition unit 132 acquires the authentication element provided from the user. The information acquisition unit 132 supplies data of the acquired authentication element to the authentication processing unit 133.

In step ST27, the authentication processing unit 133 authenticates the user using the authentication element of the user acquired in step ST26 and information pre-registered in the storage unit 131. When authentication of the user's identity succeeds, the authentication processing unit 133 generates a message of an authentication response. The message of the authentication response includes user identification information for identifying the user and assertion information of an authentication process.

In step ST28, the authentication processing unit 133 transmits the message of the authentication response generated in step ST27 to the verification unit 231.

In step ST29, the verification unit 231 verifies the validity of the authentication response received from the authentication processing unit 133. At this time, the verification unit 231 verifies the authentication response using information pre-registered in the storage unit 232.

In step ST30, the verification unit 231 transmits a request for locking the door lock and the engine lock of the moving object to the control management unit 330 within the moving object control device 300 assuming that the authentication result in step ST29 has succeeded. Also, the verification unit 231 transmits a request to delete the authentication element registered in the storage unit 323 to the storage unit 323. Additionally, the verification unit 231 requests the service providing unit 221 to delete reservation information registered in the storage unit 222. Also, the verification unit 231 deletes an authentication element certificate registered in step ST18 from the storage unit 232.

In step ST31, the control management unit 330 locks the lock of the door and the lock of the engine on the basis of the received door lock locking request and the received engine lock locking request.

In step ST32, the authentication processing unit 322 invalidates the authentication element and the authentication element certificate registered in the storage unit 323. Also, the authentication processing unit 322 appropriately deletes their information. That is, the authentication processing unit 322 completely deletes the invalid information so that the invalid information cannot be read by any means.

Thus, the process of the overall sequence chart ends.

Next, a configuration of data stored by the storage unit provided in each device will be described.

Figure 9:
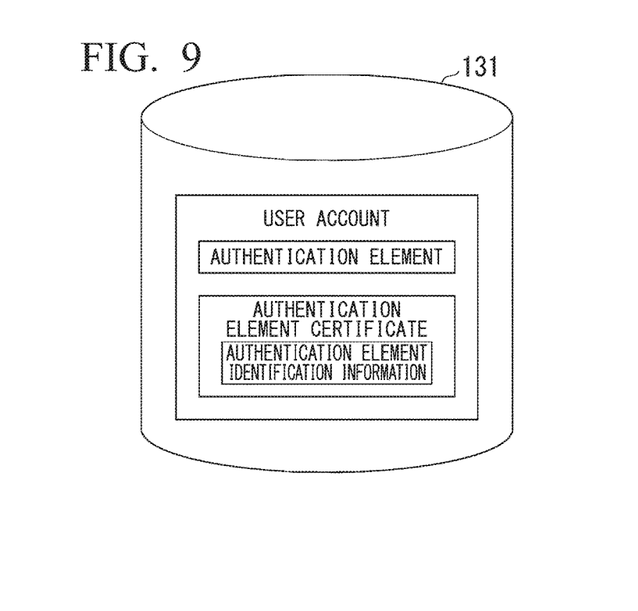
FIG. 9 is a schematic diagram illustrating a data configuration of a storage unit 131 in the present embodiment.

FIG. 9 is a schematic diagram illustrating a configuration of data stored by a storage unit 131 provided in the user terminal 100. As illustrated, the storage unit 131 retains data of information about a user account. The user terminal 100 is typically a type of terminal device carried by an individual such as a smartphone, and the storage unit 131 stores a user account for one person. However, the storage unit 131 may be configured to retain information of the user account for each of a plurality of users. The information about the user account includes an authentication element and an authentication element certificate.

The authentication element is information pre-registered for use in the authentication process such as, for example, biometrics, and is information specific to the user.

Figure 10:
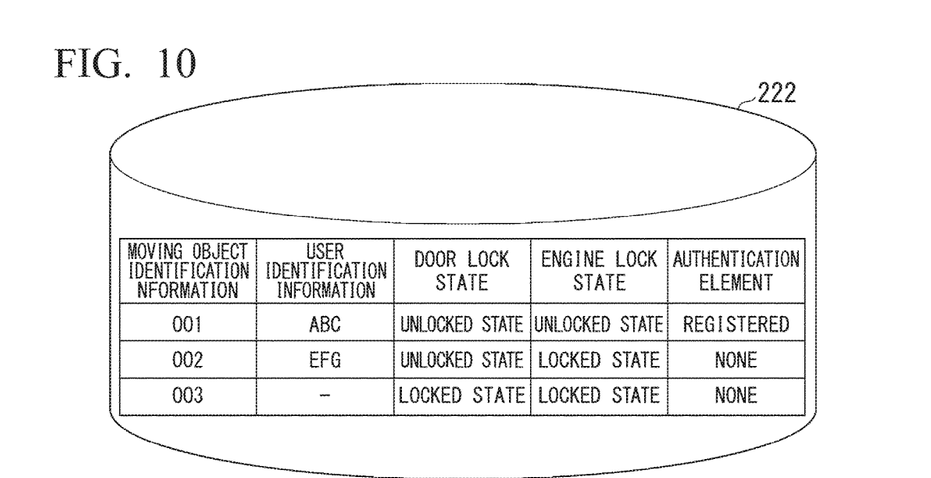
FIG. 10 is a schematic diagram illustrating a data configuration of a storage unit 222 in the present embodiment.

FIG. 10 is a schematic diagram schematically illustrating a configuration of data stored by the storage unit 222 provided in the service providing device 200. As illustrated, the storage unit 222 stores data with a structure of a table form. The table stored by the storage unit 222 has moving object identification information, user identification information, a door lock state, an engine lock state, and each data item of the authentication element. Data of one row in the table corresponds to the reservation of the moving object by a certain user.

Meanings of the data items in the table retained by the storage unit 222 are as follows.

The moving object identification information is information for identifying the moving object equipped with a moving object control device.

Identification information about a person making a reservation is information for identifying a user who uses the moving object after reserving the moving object.

The door lock state and the engine lock state are information indicating whether the door and the engine are locked or unlocked for the moving object. Each item of the door lock state and the engine lock state is a "locked state" or an "unlocked state" and stores a value indicating the state at a time point thereof. When the door lock state is the "locked state," the door of the moving object is locked and the user or the like cannot open the door of the moving object to enter the moving object. When the door lock state is the "unlocked state," the door lock of the moving object is unlocked and the user can open the door of the moving object to enter the moving object. When the engine lock state is the "locked state," the user or the like cannot start the engine. When the engine lock state is the "unlocked state," the user can start the engine.

The item of the authentication element stores data corresponding to "Registered" or "None." When the value of the item of the authentication element is "Registered," this indicates that the authentication element of the user is registered in the storage unit 323 of the moving object control device 300 in relation to the moving object for which the reservation is made. When the value of the item of the authentication element is "None," this indicates that the authentication element of the user is not registered in the storage unit 323 of the moving object control device 300 in relation to the moving object for which the reservation is made.

Figure 11:
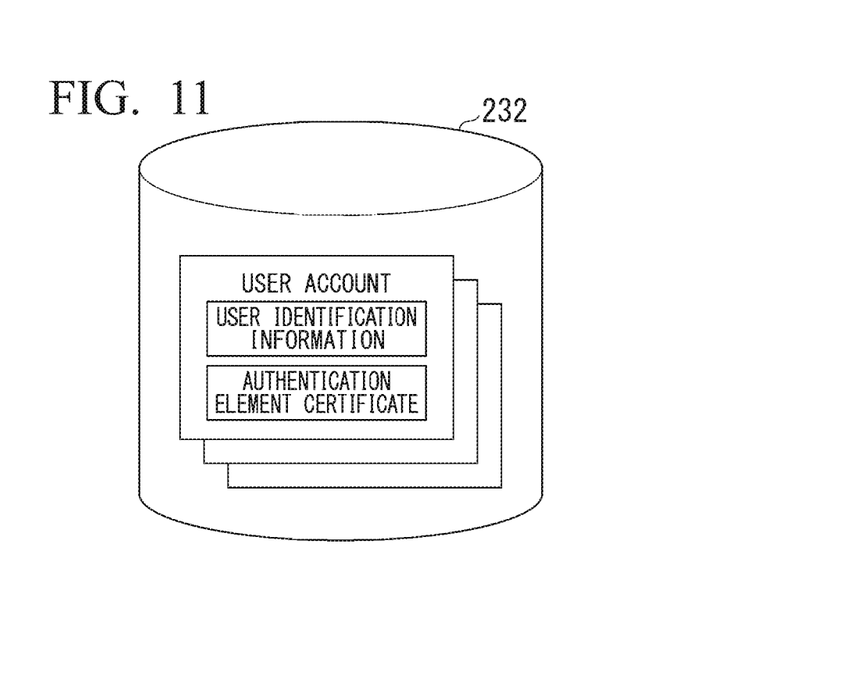
FIG. 11 is a schematic diagram illustrating a data configuration of a storage unit 232 in the present embodiment.

FIG. 11 is a schematic diagram illustrating a configuration of data stored by the storage unit 232 provided in the service providing device 200.

As illustrated, the storage unit 232 retains data of a user account in relation to each of a plurality of accounts. The data of each user account is configured to include user identification information and an authentication element certificate.

The user identification information is information for uniquely identifying the user and is associated with user identification information stored in the storage unit 222.

The authentication element certificate is an on-vehicle authentication element certificate generated by the verification unit 231 in the above-described step ST18. As described above, the on-vehicle authentication element certificate includes on-vehicle authentication element identification information for identifying an on-vehicle authentication element registered in the storage unit 323 of the moving object control device 300, an authentication assertion, and an authentication element registration assertion.

Figure 12:
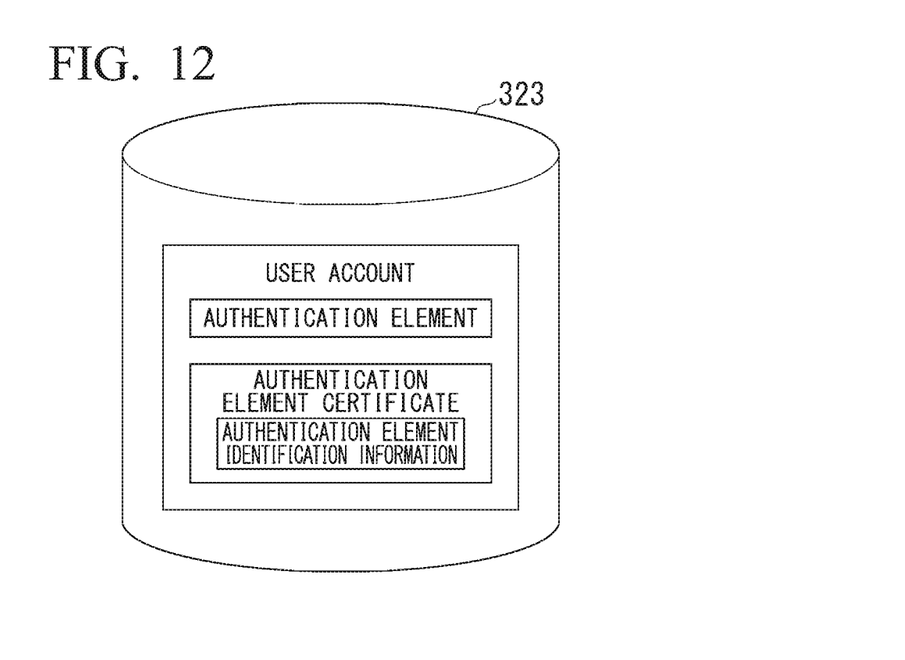
FIG. 12 is a schematic diagram illustrating a data configuration of a storage unit 323 in the present embodiment.

FIG. 12 is a schematic diagram illustrating a configuration of data stored by the storage unit 323 provided in the moving object control device 300. As illustrated, the storage unit 323 retains data of information of a user account. Assuming that the number of users of the moving object to be controlled by the moving object control device 300 at one point in time is one, the storage unit 323 retains data of one user account at one point in time. Information of the user account includes an authentication element and an authentication element certificate.

As described above, the authentication element is acquired in step ST12 and registered in the storage unit 323 in step ST16. Also, as described above, the status of the authentication element is managed in association with this authentication element. Data of the status indicates whether the authentication element stored in the storage unit 323 is valid or invalid. The authentication element is available when the status is valid and the authentication element is unavailable when the status is invalid.

The authentication element certificate is information for certifying that a series of processes has been performed correctly until the authentication element is acquired and saved. This authentication element certificate is information generated by the service providing unit 221. The authentication element certificate may be any type of certificate by which the validity of the above-described process can be asserted. However, it is preferable that, for example, a BRT certificate defined in the above-described ISO/IEC 24761 "authentication context for biometrics" be used as the authentication element certificate.

Here, a point serving as a key of a flow of main data in the authentication process of the present embodiment will be described again.

In a series of processes illustrated in FIG. 4, the service providing device 200 first transmits an authentication element registration request to the moving object control device 300 (step ST11). The information acquisition unit 321 within the moving object control device 300 acquires an authentication element (step ST12). The authentication processing unit 322 transmits a comparison request including the authentication element acquired by the information acquisition unit 321 to the user terminal 100 (step ST13). The authentication processing unit 133 of the user terminal 100 compares an authentication element transmitted from the authentication processing unit 322 with an authentication element (a user terminal authentication element) stored in the storage unit 131 within the user terminal 100 (step ST14). When this comparison is done correctly, the authentication processing unit 322 within the moving object control device 300 stores an authentication element (an on-vehicle authentication element) acquired by the information acquisition unit 321 (step ST16). However, in this step, the status of the authentication element stored in the storage unit 323 is still "invalid." The authentication processing unit 322 transmits an authentication element registration response to the service providing device 200 (step ST17). The verification unit 231 within the service providing device 200 verifies the transmitted authentication element registration response. When the verification has been performed correctly, the verification unit 231 transmits an on-vehicle authentication element certificate indicating that the verification has been completed correctly to the moving object control device 300 (step ST19). Also, in the present embodiment, the transmission in step ST19 is performed with a message of an engine unlock response and includes the meaning of engine unlock permission. The authentication processing unit 322 of the moving object control device 300 changes the status of the on-vehicle authentication element stored in the storage unit 323 to a "valid" status on the basis of the received on-vehicle authentication element certificate.

As described above, the authentication element acquired in the moving object control device 300 is transmitted to the user terminal 100 for the comparison, but is not transmitted to the service providing device 200. Consequently, the authentication element is not transmitted on a communication link between the moving object control device 300 and the service providing device 200. Also, in a series of processes of the above-described steps ST11 to ST19, the validity of the process is asserted and verified using appropriate assertion information. Also, after the authentication element stored in the storage unit 323 is set to be "valid" in step ST19, even if the communication between the moving object control device 300 and the service providing device 200 is disconnected, only the moving object control device 300 can access the authentication element and its validity is verified.

Also, when the use of the moving object by the user ends, the authentication element within the storage unit 323 is deleted.

The user terminal, the moving object control device, and the service providing device according to the present embodiment are implemented using an electronic circuit as a main element. The electronic circuit inputs a logical value, performs a process based on an input value, and outputs a processing result as a logical value. Also, in this process, a storage means is appropriately used. Using the technology of a computer, the user terminal, the moving object control device, and the service providing device may be implemented. In this case, these are implemented by recording a program for implementing functions of the devices on a computer-readable recording medium and causing a computer system to read and execute the program recorded on the recording medium.

An object (a moving object) to be controlled by the above-described moving object control device 300 is a vehicle (an automobile) to be used in a service of car sharing or a rental car. The moving object is not limited to the automobile and may be a bicycle, a motorcycle, an aircraft, a helicopter, a boat, a train, construction machinery, construction equipment, a camera, sound equipment, a musical instrument, or the like. Also, the above-described moving object control device 300 is described as a device which controls a moving object, but an object to be controlled may not move. For example, the object to be controlled by the control device may be a building, a room, or the like.

According to the above-described embodiment, the user terminal 100 performs authentication when the moving object (the object) is rented and performs personal authentication using an authentication element registered in the moving object control device 300 while the moving object is used. Consequently, it is unnecessary for the user to have a token such as a member ID card. Also, the authentication element is registered in only the user terminal 10 and the moving object control device 300. Because it is unnecessary to transmit the authentication element to the service providing device 200 via a wide area network (WAN), it is possible to eliminate a risk of leakage of information of the authentication element at the time of transmission on a WAN. Consequently, it is possible to use the authentication element securely. Also, when biological information of the user is used as the authentication element, it is possible to implement reliable personal authentication and it is possible to eliminate a risk of leakage of biological information at the time of WAN transmission.

Also, because authentication information of the user is registered in the moving object control device 300 after the user terminal 100 performs an authentication process and the service providing device verifies the authentication process according to the above-described embodiment, personal authentication after the rental of the moving object is enabled using the authentication element in the authentication process even in an environment in which a connection with the service providing device 200 (the server) is impossible while the user uses the moving body. That is, it is unnecessary to maintain a constant connection of communication between the moving object control device 300 and the service providing device 200 or between the user terminal 100 and the service providing device 200.

Also, according to the above-described embodiment, the moving object control device 300 can control a functional unit of the moving object according to an authentication result. Conventionally, even in relation to a functional unit which locks/unlocks a lock with a physical key, locking/unlocking can be controlled according to the above-describe authentication result. Consequently, it is unnecessary for the user to use the physical key.

Although embodiments of the present invention have been described, these embodiments have been proposed as examples and are not intended to limit the range of the invention. These embodiments can be executed in various other modes. Various omissions, replacements, and changes can be made in a range not departing from the scope of the invention. These embodiments and modifications thereof are encompassed in the range and the scope of the invention and are encompassed in the invention as described in the scope of the invention and equivalents thereof.

The invention claimed is:

1. An authentication system comprising:
 a control device;
 a user terminal; and
 a service providing device, wherein the control device includes:
  a first storage configured to store information;
  an information acquirer configured to acquire a first authentication element for authentication;
  a first authentication processor configured to transmit to the user terminal a comparison request message including the first authentication element for comparison with a second authentication element stored in the user terminal, receive a comparison response message corresponding to the comparison request message from the user terminal, register the first authentication element in the first storage and invalidate a status of the first authentication element when the comparison response message indicates comparison success, transmit an authentication element registration response message to the service providing device, and validate the status of the first authentication element registered in the first storage when an authentication element validation instruction is received from the service providing device in correspondence with the authentication element registration response message; and
  a control manager configured to control an object based on a validation of the status of the first authentication element, wherein the user terminal includes:
   a second storage configured to pre-store the second authentication element which is a user authentication element of a user; and
   a second authentication processor configured to compare the first authentication element included in the comparison request message with the second authentication element stored in the second storage when the comparison request message including the first authentication element is received from the control device, and transmit the comparison response message including information indicating whether a comparison process succeeded or failed to the control device, and wherein the service providing device includes:
    a verifier configured to verify assertion information related to an authentication process included in the authentication element registration response message when the authentication element registration response message is received from the control device, and transmit the authentication element validation instruction for validating the status of the first authentication element stored in the first storage within the control device to the control device when the verification succeeds; and
    a service provider configured to manage a state for providing a user with a service using an object to be controlled by the control device when the verification succeeds.

2. The authentication system according to claim 1, wherein the first authentication element is information of an authentication element for use in biometrics.

3. A control device comprising:
 a storage configured to store information;
 an information acquirer configured to acquire a first authentication element for authentication;
 an authentication processor configured to transmit to a user terminal a comparison request message including the first authentication element for comparison with a second authentication element stored in the user terminal, receive a comparison response message corresponding to the comparison request message from the user terminal, register the first authentication element in the storage and invalidate a status of the first authentication element when the comparison response message indicates comparison success, transmit an authentication element registration response message to a service providing device, and validate the status of the first authentication element registered in the storage when an authentication element validation instruction is received from the service providing device in correspondence with the authentication element registration response message; and a control manager configured to control an object based on a validation of the status of the first authentication element.

4. An authentication method using an authentication system configured to include a control device for controlling an object, a user terminal, and a service providing device, the authentication method comprising:

acquiring, by the control device, an authentication element from a user;

issuing a request for comparison of the authentication element from the control device to the user terminal;

comparing, by the user terminal, the authentication request transmitted from the control device with a pre-stored authentication element of the user and transmitting a result of the comparison as a comparison response to the control device;

registering the authentication element in a storage provided in the control device and invalidating a status of the authentication element when the comparison in the user terminal succeeds;

verifying, by the service providing device, an authentication process from the acquiring to the registering;

validating a status of the authentication element registered in the storage provided in the control device when the verification in the service providing device succeeds; and performing, by the control device, control so that a user is able to use the object when the verification in the service providing device succeeds.

\* \* \* \* \*